United States Patent [19]

Thompson et al.

[11] 3,746,160

[45] July 17, 1973

[54] HERMETICALLY SEALED SHIPPING PACKAGE AND METHOD OF PREPARING SAME

[75] Inventors: Henry Bryan Thompson, Duncan; Jerry Lee Mautz, Greenville, both of S.C.

[73] Assignee: W. R. Grace & Co., Duncan, S.C.

[22] Filed: Jan. 21, 1971

[21] Appl. No.: 108,509

[52] U.S. Cl. ...... 206/65 S, 206/45.33, 229/DIG. 12, 206/65 E
[51] Int. Cl. ...................... B65d 65/16, B65d 85/62
[58] Field of Search .............. 206/65 S, 65 E, 45.33; 229/65, DIG. 12; 215/38 A

[56] References Cited
UNITED STATES PATENTS 3,093,448   6/1963   Kirkpatrick et al. ......... 229/DIG. 12
3,358,902  12/1967   Emmert et al. .................... 215/38 A Primary Examiner—William T. Dixson, Jr.
Attorney—John J. Toney, William D. Lee, Jr. and Edward J. Hanson, Jr.

[57] ABSTRACT

A hermetically sealed shipping container particularly suitable for shipping hazardous liquids is formed by placing the liquid containers on a tray, wrapping the tube and containers in a longitudinally sealed tube of monoaxially oriented and heat-shrinkable film with the film extending beyond the ends of the tray, shrinking the film tightly around the containers and tray, and thereafter applying clips to the shrunken tube openings at either end of the package to seal the package. The resulting package holds the containers securely in place, is impervious to liquids, and is resistent to acids, bleaches, or the like.

6 Claims, 3 Drawing Figures

Patented July 17, 1973 3,746,160

INVENTORS:
 HENRY B. THOMPSON
 JERRY L. MAUTZ

BY *William D. Lee, Jr.*
 ATTORNEY

HERMETICALLY SEALED SHIPPING PACKAGE AND METHOD OF PREPARING SAME

FIELD OF THE INVENTION

This invention relates to industrial shipping packages or containers. Specifically, this invention relates to shipping packages for transporting a plurality of containers or bottles containing hazardous liquids such as acids, bleaches, or solvents.

BACKGROUND OF THE INVENTION

Because of their unique properties, the heat shrinkable thermoplastic films have attracted a greal deal of attention in packaging applications. These films are generally those made from polyvinylidene chloride, irradiated polyethylene, polyvinyl chloride, and polypropylene. Such films can be wrapped about objects, sealed, and then shrunken tightly about the objects to form neat, wrinkle free packages which hold the objects securely in place. If a package is completely sealed, it is customary in the prior art to provide a deflate hole in the film so that when it is shrunken the entrapped air may escape. If no provision is made for the escape of air, obviously, the entrapped air will give the film a balloon-like appearance as the film attempts to shrink under the influence of heat. The presence of a deflate hole allows any liquids or gases emitted from any of the articles contained within the package to escape. Accordingly, it is an object of the present invention to provide a package from heat shrunken film which is hermetically sealed and free from any holes or aperatures.

An early prior art example of packaging a single object in monoaxially oriented, heat shrinkable, rubber hydrochloride film is found in the patent to Curry, U.S. Pat. No. 2,878,628. In the Curry patent, the film is formed in a tube, sealed longitudinally, and then shrunken leaving the ends of the package open. A prior art example in which a plurality of objects is packaged and held securely together is disclosed in the patent to Dreyfus, U.S. Pat. No. 3,215,266. In the Dreyfus patent, biaxially oriented polyethylene film is formed in a tube around either an object or a collection of objects, and the tube is shrunken tightly around the objects to hold them securely in place. However, in the Dreyfus patent as well as in the Curry patent the ends of the package are left open.

In addition to using the tension forces in heat shrunken film to hold a plurality of objects securely together, prior art packages have also used, in combination with the shrunken film, trays and protective partitions to make shipping containers for a plurality of objects such as a case of bottles. One example of such a package is shown in the patent to Farquhar, U.S. Pat. No. 3,416,653, wherein a plurality of bottles are placed in a supporting carton and overwrapped with a heat shrinkable film which tends to hold the bottles securely in place. Still another example is found in the patent to Ayer, U.S. Pat. No. 3,425,544, wherein a case of bottles or cans are placed on a tray with partitions extending the height of the bottles to protect them. In addition, the botles are held tightly in place by a shrunken film overwrap. However, in neither the Farquhar or Ayer patent are the ends of the package sealed. Thus, it is another object of the present invention to provide a package which has the advantages provided by partitioned trays and shrunken film overwrap and at the same time is hermetically sealed. The accomplishment of this and other objects will be understood from the following description of the invention.

SUMMARY OF THE INVENTION

In its broadest aspect, the present invention is a hermetically sealed shipping package comprising at least one object, a tube of heat shrunken monoaxially oriented film tightly enclosing said object, and a seal or closure means hermetically sealing each end of the tube. In a more limited aspect, the present invention comprises a plurality of objects disposed on a supporting member with a tube of heat shrunken monoaxially oriented film securely holding said objects on the supporting member and a closure means at each end of said tube hermetically sealing the tube. The supporting member may be a tray with dividers to separate the objects and provide load carrying support for vertical stacking of the packages. The closure means can be a seal such as a heat seal which fuses the end of the tube together; or, preferably the closure can be a mechanically applied clip.

In its broadest aspect, the process of the present invention comprises the steps of enveloping at least one object in a tube of monoaxially oriented film wherein the film is positioned so that the radius of said tube decreases upon heat shrinking, each end of the tube extending beyond the object so that sufficient film material is provided to close the tube and seal same; heat shrinking said tube so that it tightly contacts said object; and thereafter sealing each end of said tube. In a more limited aspect, the method of the present invention comprises placing a plurality of objects on a supporting member and then enclosing said objects in a tube of monoaxially oriented film and thereafter shrinking said tube about said objects and sealing each end of said tube. A seamless tube can be used, or a tube may be made by sealing together the two ends of a sheet of film. A preferred film for the invention is monoaxially oriented, cross-linked polyethylene film; or, also preferred is polyvinyl chloride film.

DESCRIPTION OF THE PREFERRED EMBODIMENTS

Figure 1:
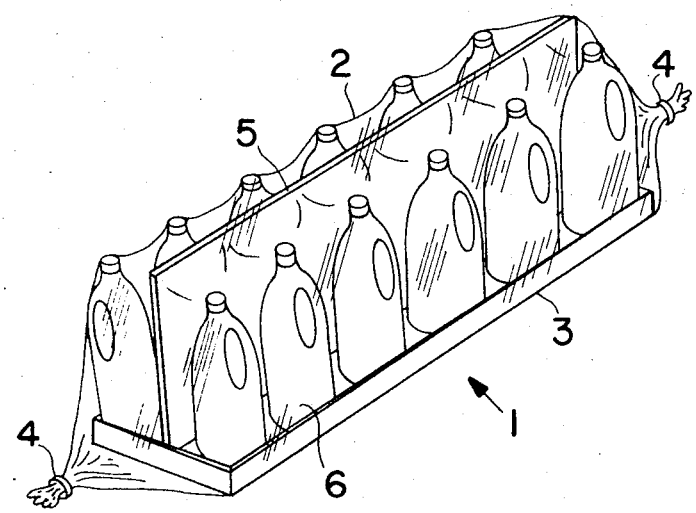
FIG. 1 is a perspective representation of one embodiment of a package according to the present invention.

Referring first to FIG. 1, a completed package 1 according to the present invention is seen. This package comprises the shrunken film tube 2, a supporting member or tray 3, closure means or clips 4, a stacking divider 5 for carrying vertical loads when the packages are stacked, and a plurality of objects or bottles 6.

Figure 2:
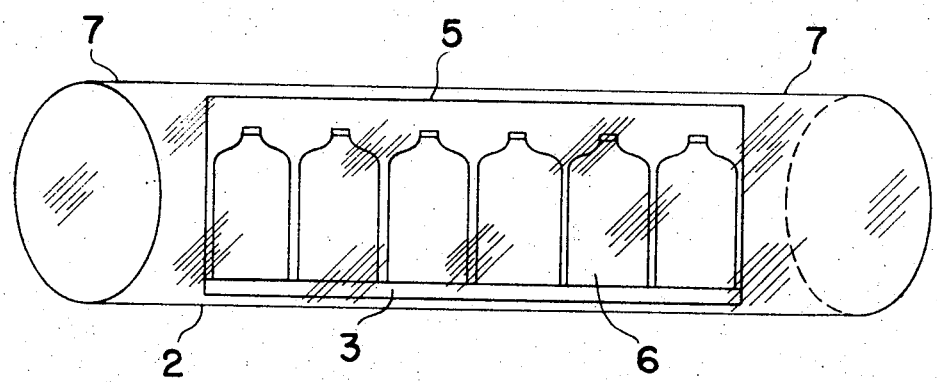
FIG. 2 is a schematic representation of one step in making a package according to the present invention; and, FIG. 3 is a schematic representation of another step in preparing a package according to the present invention.
Figure 3:
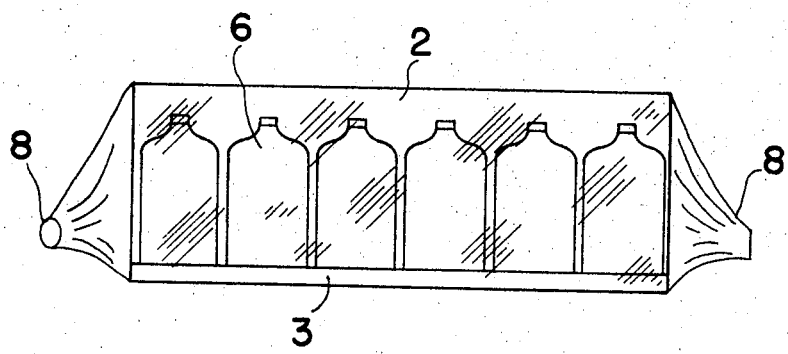

Looking now at FIG. 2, a plurality of objects 6 is shown on supporting member 3 enveloped by the film tube 2 having end portion 7 thereof extending beyond the supporting member 3 and objects 6. Enveloping the objects and supporting member as shown in FIG. 2 is one step in the method of the present invention. The film tube 2 can be a seamless tube or it can be formed by bringing the ends of a sheet together and sealing same. It is essential that the orientation of the film be such that when heat is applied the radius of the tube will diminish without substantial decrease in the length of the tube. The reason for this is illustrated in FIG. 3 which shows the tube of FIG. 2 after heat has been applied to shrink it and decrease its radius. The objects 6 and tray 3 enclosed in the shrunken tube 2 in FIG. 3 restrain, in their respective region, the shrinkage of the tube and are thereby held tightly and securely in place. The unrestrained portions 8 of the tube 2 which extend beyond the tray are shrunken and have an appearance as shown. These end portions can be clipped together with a mechanical clipper using metal or plastic clips or the ends could be fused and sealed with the application of heat. When sealed, the package is hermetically closed thus offering protection against the leakage from any of the products contained therein.

For the purposes of this invention, monoaxially oriented film means a film which has been preferentially oriented in one direction only and the orientation in the other direction is only consequential. This would mean that the film for tube 2 of FIGS. 2 and 3 is oriented radially so that the radius of the tube decreases when the film is shrunk and there is not enough longitudinal orientation to pull the ends of the film 7 back to or over the tray 2, i.e. the longitudinal orientation is sufficiently small so that the shrunken ends 8 of the tube have enough film material so that the respective openings therein can close on themselves.

A metal clip which can be mechanically applied to close the shrunken openings in the ends of the tube of the package in the present invention is described in the patent to Tipper, U.S. Pat. No. 3,266,138. These clips are U-shaped and are forced around the gathered material by a punch and die. A complete apparatus for so fastening the clips is described in another patent to Tipper, U.S. Pat. No. 3,210,835.

Preferred films for the present inention are monoaxially oriented film prepared from polyethylene which has been cross-linked by irradiation or polyvinyl chloride. The irradiated polyethylene is acid resistent, tough, and resists melting at elevated temperatures.

The package of this invention and the method for making the package may be employed with various supporting members or trays and dividers with vertical load carrying ability. Even a single object without a support member can be hermetically shrink packaged by the present method whereas, in the prior art, hermetically sealed shrink packages could only be accomplished by resealing or patching the deflate hole.

We claim:

1. A hermetically sealed shipping package comprising:
   a. a supporting member;
   b. a plurality of objects carried by said supporting member;
   c. a tube of heat shrunken, monoaxially oriented film securely holding said objects on said supporting member, each end of said tube being shrunken to cover the end areas of said package; and,
   d. sealing means hermetically enclosing each end of said tube.

2. The package of claim 1 wherein the supporting member is a tray.

3. The shipping package of claim 2 wherein said tray has at least one load carrying protective divider.

4. The shipping package of claim 1 wherein the film is cross-linked, monoaxially oriented polyethylene.

5. A process for making a hermetically sealed shipping package from shrinkable film without a vacuum chamber or deflate hole in said film comprising the steps of:
   a. placing a plurality of objects on a supporting member;
   b. enveloping said objects and said supporting member in a tube of monoaxially oriented film, said film being shrinkable so that the radius of said tube decreases when heat is applied thereto, and each end of said tube extending beyond the objects and the supporting member to completely cover both of same;
   c. applying heat to said tube to shrink it tightly about said objects and supporting member so that the ends of said package are enclosed; and,
   d. hermetically sealing the ends of said tube.

6. The method of claim 5 wherein the tube is monoaxially oriented, cross-linked, polyethylene.

* * * * *